(No Model.)
L. LAZARUS.
SPECTACLE AND EYEGLASS FRAME.
No. 319,733. Patented June 9, 1885.
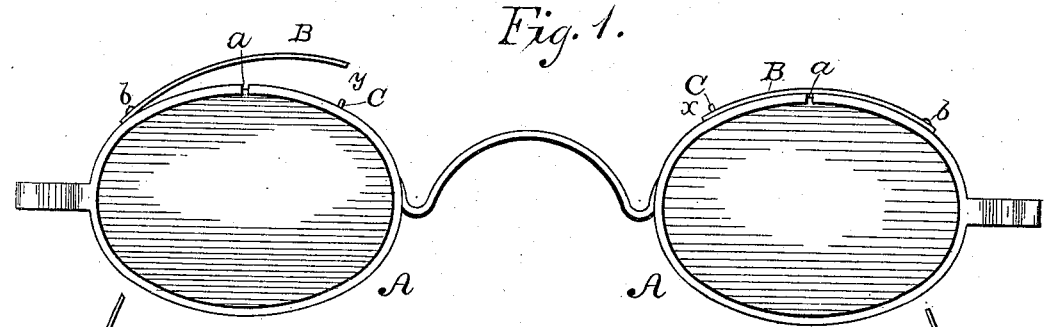
WITNESSES:
INVENTOR:
Louis Lazarus
BY Munn
ATTORNEYS.

UNITED STATES PATENT OFFICE.

LOUIS LAZARUS, OF ALLEGHENY, PENNSYLVANIA.

SPECTACLE AND EYEGLASS FRAME.

SPECIFICATION forming part of Letters Patent No. 319,733, dated June 9, 1885.

Application filed September 13, 1884. (No model.)

*To all whom it may concern:*

Be it known that I, LOUIS LAZARUS, a citizen of the United States, residing at Allegheny, in the county of Allegheny and State of Pennsylvania, have invented certain new and useful Improvements in Spectacle and Eyeglass Frames, of which the following is a description.

Figure 1 represents a front view of a pair of spectacles the frame of which is constructed according to my invention. Fig. 2 is a plan view of the same.

My invention is an improvement in the class of eyeglasses or spectacles whose bows or lens-holders are cut or divided transversely to allow insertion of new lenses when required to replace defective or broken ones. Heretofore the connection between the adjacent ends of the portions of the lens-holders thus cut or divided has been formed by means of straight wire links, and their use is attended by certain disadvantages which are not incident to my invention. Instead of such links, I employ flat, thin, curved, flexible metal tapes or springs, which are attached to and lie in close contact with the exterior portions of the bows or lens-holders. They thus form an attachment of the bows which is not noticeable, and scarcely perceivable, except upon close examination, and also holds the abutting ends of the divided bows pressed down upon the lenses, so that the latter hold the lenses securely.

Referring to the drawings, A indicates the frame of a pair of spectacles, and B the flexible metal tape or flat springs applied thereto. The bows or lens-holders are cut or divided transversely, as shown at *a*, Fig. 1. A metal tape, B, which has the same width as the bows, is secured by rivet *b* to each of the latter on one side of cut *a*, and its free end is provided with a hole or slot, *b'*, to adapt it to connect with a stud, C, fixed in the bow on the other side of said cut. In one portion of Fig. 1 the apertured or slotted end of the tape B is shown detached, as required, to allow insertion of a lens, and in the opposite portion of the same figure it is shown attached to said stud C, as required, to hold the lens securely in place and adapt the spectacles for use.

It will be seen that the great advantage of convenient insertion of new lenses is not attended by serious impairment of the appearance or ornamental configuration of the spectacles, nor are the bows or lens-holders materially weakened, since the metal tapes B not only occupy the least space possible, but also conform to the curve of the bows and hold the adjacent ends of the divided portions closely down upon the lenses, so that the latter are not liable to become loose or detached, and thereby broken or lost.

Having thus described my invention, what I claim is—

In combination with a spectacle-bow which is transversely divided and provided with a stud, C, the flat flexible metal tape B, secured by rivet *b*, and having a slot in its free end, all as shown and described.

LOUIS LAZARUS.

Witnesses:
 JAMES McGAW,
 WILLIAM SWEENEY.